(12) United States Patent
Arens et al.

(10) Patent No.: US 10,388,037 B2
(45) Date of Patent: Aug. 20, 2019

(54) SELECTION METHOD FOR AN ARTIFACT CORRECTION ALGORITHM, DATA PROCESSING FACILITY FOR PERFORMING THE METHOD, AND MEDICAL IMAGING SYSTEM

(71) Applicant: Siemens Healthcare GmbH, Erlangen (DE)

(72) Inventors: Stephan Arens, Nuremberg (DE); Roland Barthel, Forchheim (DE); Andreas Krauss, Fuerth (DE); Gerhard Lechsel, Erlangen (DE); Rainer Raupach, Heroldsbach (DE); Niklas Rehfeld, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 219 days.

(21) Appl. No.: 15/421,780

(22) Filed: Feb. 1, 2017

(65) Prior Publication Data
US 2017/0236309 A1    Aug. 17, 2017

(30) Foreign Application Priority Data

Feb. 17, 2016  (DE) .......... 10 2016 202 434

(51) Int. Cl.
*G06K 9/00*  (2006.01)
*G06T 11/00*  (2006.01)
(Continued)

(52) U.S. Cl.
CPC .......... *G06T 11/008* (2013.01); *G06T 7/0012* (2013.01); *G06T 7/11* (2017.01); *G06T 2207/10081* (2013.01)

(58) Field of Classification Search
CPC ......... G06T 11/008; G06T 2207/10081; G06T 7/0012; G06T 7/11
See application file for complete search history.

(56) References Cited

U.S. PATENT DOCUMENTS 6,094,467 A    7/2000  Gayer
7,991,243 B2 *  8/2011  Bal ........................ G06T 11/008
                                                                    378/21
(Continued)

OTHER PUBLICATIONS

Boas F. et al.: „Evaluation of two Iterative Techniques for Reducing Metal Artifacts in Computed Tomography, in: Radiology, vol. 259, No. 3; Jun. 2011, pp. 894-902, http://radiology.rsna.org/lookup/suppl; DOI:10.1148/radiol.11101782/-/DC1.
(Continued)

*Primary Examiner* — Tom Y Lu
(74) *Attorney, Agent, or Firm* — Harness, Dickey & Pierce, P.L.C.

(57) ABSTRACT

According to an embodiment of the application, a method is provided for selecting an algorithm for correcting at least one image artifact in an image data record acquired by a medical imaging system and representing at least one region of interest of a subject under examination. The method includes identifying from the image data record at least one object element causing the image artifact and lying inside the region of interest of the subject under examination; determining from the image data record at least one characteristic describing the object element; determining an artifact correction algorithm on the basis of the at least one characteristic; and applying the artifact correction algorithm to the image data record. An embodiment of the application also provides a corresponding data processing facility and a medical imaging system.

24 Claims, 2 Drawing Sheets

(51) Int. Cl.
    *G06T 7/11*           (2017.01)
    *G06T 7/00*           (2017.01)

(56) References Cited

U.S. PATENT DOCUMENTS

| | | | | |
|---|---|---|---|---|
| 8,605,970 | B2* | 12/2013 | Bar-Aviv | G06T 5/50 |
| | | | | 378/4 |
| 9,153,012 | B2* | 10/2015 | Bredno | G06T 5/50 |
| 2006/0018526 | A1* | 1/2006 | Avinash | G06T 5/50 |
| | | | | 382/132 |
| 2008/0152203 | A1* | 6/2008 | Bal | G06T 11/008 |
| | | | | 382/131 |
| 2015/0117740 | A1 | 4/2015 | Dong | |
| 2015/0146955 | A1 | 5/2015 | Dong | |
| 2015/0356728 | A1* | 12/2015 | Nakanishi | A61B 6/032 |
| | | | | 382/131 |

OTHER PUBLICATIONS

Meyer, Ester et al.: "Normalized Metal Artifact Reduction (NMAR) in Computed Tomography", in: Med. Phys. 37, vol. 10, Oct. 2010, pp. 5482-5493, DOI:10.1118/1.3484090; 2010.
Meyer, Ester et al.:"Frequency split metal artifact reduction (FSMAR) in computed tomography"; in: Medical Physics; vol. 39; No. 4; pp. 1904-1916; DOI: 10.1118/1.3691902 / Mar. 4, 2012.
DE OA 10 2016 202 434.5 dated Oct. 13, 2016.

\* cited by examiner

SELECTION METHOD FOR AN ARTIFACT CORRECTION ALGORITHM, DATA PROCESSING FACILITY FOR PERFORMING THE METHOD, AND MEDICAL IMAGING SYSTEM

PRIORITY STATEMENT

The present application hereby claims priority under 35 U.S.C. § 119 to German patent application number DE 102016202434.5 filed Feb. 17, 2016, the entire contents of which are hereby incorporated herein by reference.

FIELD

At least one embodiment of the invention generally relates to a method for selecting an artifact correction algorithm for use on tomographic image data records acquired for a subject under examination, which method improves adaptation of the artifact correction algorithm to the properties of an object element causing the artifact.

BACKGROUND

Methods for reconstructing tomographic image data records from detector data from a scan of a subject under examination, for instance via a computed tomography system or the like, are generally known. If foreign bodies, in particular metal objects, are present in the subject under examination, then severe image artifacts, known as metal artifacts, can arise as a result of intensified beam hardening, increased beam scatter, a partial volume effect and/or increased noise, which noticeably reduce the quality of the reconstructed computed tomography images in the sense that the image information contains major differences from the actual situation in the imaged region of the subject under examination, and hence may be inconsistent. Which of the effects is the dominant factor impairing the image quality primarily depends on the shape, the composition and the size of the metallic object in the subject under examination.

Numerous widely different methods are known for eliminating or reducing metal artifacts, and can be classified into two groups:

Physical corrections attempt to model the physical error source for the image artifacts, and to make corresponding corrections. Since the artifacts typically result from a combination of a plurality of effects, this is very complex and is based on the assumption, amongst others, that the detector signals can be analyzed quantitatively. An example of a physical correction is a beam hardening correction that considers a two-component water/metal system. The physical assumptions needed for this correction fall down when the metal attenuation is too great, i.e. the metal is too dense or too large.

This class can also include methods that formulate the correction terms in the raw-data space or image space as an expansion, e.g. as a polynomial, of the line integral having unconstrained parameters, and then optimize same globally or locally under a constraint, e.g. the smoothness in the form of the "total variation" (TV). This procedure works when the expansion for describing the artifacts fits the signature of the artifacts, and the intensity can be covered by the order of the expansion.

In contrast to these physical correction methods, sinogram interpolation (SI) techniques assume that the measurement rays that have passed through metal are generally unusable and must be replaced by estimated values. Normalization/de-normalization steps can also be added in order to reduce the artifacts newly introduced by simple interpolations.

Statistical iterative methods, in which the contributory weighting of rays that have passed through metal is made extremely low, come under this class. In this case, the iteration supplies the missing information from weighted averages in the vicinity, which is ultimately a complicated formulation of an interpolation. But even these methods deliver unsatisfactory image quality.

SI has problems especially with artifact correction in the immediate vicinity around the metal. Structures close to the metal are often not acquired in sufficient quality because close to the metal, true measured values are discarded in a large projection-angle range. If an area is completely enclosed by metal, then almost no measured information is left available for this image region. SI has advantages for extremely severe metal artifacts for which the image is practically unusable without correction. For metal objects that are small or not very dense, the described side-effects of the correction may predominate, because the usable partial information that still exists in the data is not used at all.

Inventors of embodiments of the present application number amongst the contributors to the following publications, the entire contents of each of which are hereby incorporated herein by reference, which are cited by way of example and describe or present in greater detail the various metal artifact correction techniques:

E. Meyer, R. Raupach, M. Lell, M. Kachelrieß: "Frequency Split Metal Artifact Reduction (FSMAR) in Computed Tomography", Med. Phys. 39(4), April 2012

E. Meyer, R. Raupach, M. Lell, M. Kachelrieß: "Normalized Metal Artifact Reduction (NMAR) in Computed Tomography", Med. Phys. 37(10), October 2010

F. Boas, D. Fleischmann: "Evaluation of two Iterative Techniques for Reducing Metal Artifacts in Computed Tomography", Radiology 259(3), pages 894-902, 2011

Although the techniques mentioned above sometimes produce good results, each algorithm has its specific residual artifacts. The correction result therefore depends not only on the characteristics of the object element causing the artifact but also on the algorithm used and the parameters set for this algorithm.

Nowadays, the correction algorithm to be used is usually selected manually by the user, who can select, for example from a list of possible implants, the implant that is present in the subject under examination, e.g. cardiac pacemaker, dental implant, hip implant, etc. For each implant can be stored a particular correction algorithm, which includes specific parameter settings and is optimized for this implant, and is then applied according to the selection.

SUMMARY

The inventors have recognized that this procedure takes only insufficient account of the individual properties of an implant and/or of the fact that there may be a plurality of implants inside the imaged region. Artifact corrections that are consequently used and/or their parameter settings may hence be unsatisfactory in terms of the correction result achieved.

At least one embodiment of the present application improves the selection of an artifact reduction technique over the prior art such that better account is taken of the properties of the object element causing the artifact.

At least one embodiment of the present application is directed to a method and at least one embodiment of the present application is directed to an apparatus. The subject matter of each of the claims contains advantageous embodiments and developments.

The manner in which the application achieves advantages described below with reference to embodiments of the method equally applies to the embodiments of the apparatuses, and vice versa. Features, advantages or alternative embodiments mentioned in this connection can also be applied equally to the other embodiments, and vice versa. In other words, claims relating to physical objects (which embodiments are aimed at a method, for example) can also be developed by combining with features described or embodiments in connection with an apparatus. The corresponding functional features of the method are embodied in this case by corresponding physical modules or units.

At least one embodiment of the present application relates to a method for selecting an algorithm for correcting at least one image artifact in an image data record that is acquired by a medical imaging system and represents at least one region of interest of a subject under examination. The method comprises:

identifying from the image data record at least one object element that is causing the image artifact and lies inside the region of interest of the subject under examination;
determining from the image data record at least one characteristic describing the object element;
determining an artifact correction algorithm on the basis of the at least one characteristic; and
applying the artifact correction algorithm to the image data record.

The medical imaging system is preferably a computed tomography system or a C-arm X-ray machine. Other embodiment variants of the medical imaging system, in particular from non-medical sectors, are likewise possible and are covered by embodiments of the present invention.

At least one embodiment of the invention also relates to a data processing facility for selecting an algorithm for correcting an image artifact in an image data record that is acquired by a medical imaging system and represents at least one region of interest of a subject under examination. This data processing facility including one or more processors configured to execute computer-readable instructions such that the one or more processors are configured to:

to identify from the image data record at least one object element that is causing an image artifact and lies inside the region of interest of the subject under examination;
to determine from the image data record at least one characteristic describing the object element;
to determine a suitable artifact correction algorithm on the basis of the at least one characteristic; and
to apply the artifact correction algorithm to the image data record.

With regard to a detailed description and/or advantages of individual aspects of the data processing facility according to embodiments of the invention, reference is made to the embodiments of the method according to embodiments of the invention, which can be applied correspondingly to the device.

In addition, at least one embodiment of the invention relates to a medical imaging system for selecting an algorithm for correcting an image artifact in an image data record that is acquired by the imaging system and represents at least one region of interest of a subject under examination. This medical imaging system comprises a data processing facility which is designed:

to identify from the image data record at least one object element that is causing an image artifact and lies inside the region of interest of the subject under examination;
to determine from the image data record at least one characteristic describing the object element;
to determine a suitable artifact correction algorithm on the basis of the at least one characteristic; and
to apply the artifact correction algorithm to the image data record.

In a particularly preferred embodiment variant, the medical imaging system is in the form of an X-ray computed tomography machine or a C-arm X-ray machine.

BRIEF DESCRIPTION OF THE DRAWINGS

The following description of the example embodiments, which are explained in greater detail in conjunction with the drawings, will clarify and elucidate the above-described properties, features and advantages of this application, and the manner in which they are achieved. This description does not restrict the application to these example embodiments. Identical components are denoted by the same reference signs in different figures. The figures are generally not shown to scale, in which.

DETAILED DESCRIPTION OF THE EXAMPLE EMBODIMENTS

Figure 1:
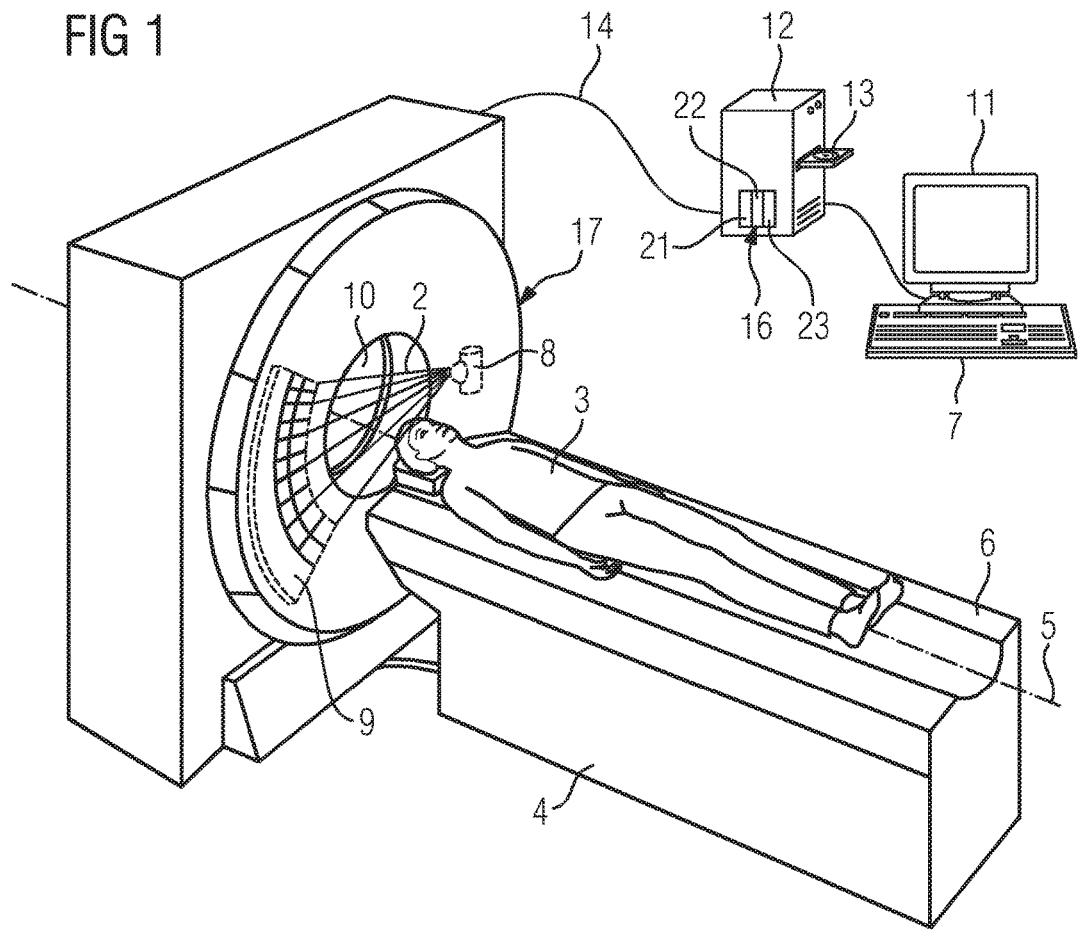
FIG. 1 shows a medical imaging system in the form of a computed tomography apparatus according to an example embodiment of the application.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. Embodiments of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. Embodiments of the invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the present application relates to a method for selecting an algorithm for correcting at least one image artifact in an image data record that is acquired by a medical imaging system and represents at least one region of interest of a subject under examination. The method comprises:
  identifying from the image data record at least one object element that is causing the image artifact and lies inside the region of interest of the subject under examination;
  determining from the image data record at least one characteristic describing the object element;
  determining an artifact correction algorithm on the basis of the at least one characteristic; and
  applying the artifact correction algorithm to the image data record.

This procedure differs from the known procedure of taking purely qualitative account of an object element causing an image artifact, e.g. about the type of an implant, in selecting a correction technique. Instead, according to the findings of the inventors, a quantitative analysis of the image information is performed regarding the object element causing the artifact, in the sense that specific properties or characteristics of this object element are determined and form the basis for the selection and/or parameter settings of a correction technique. An improved adaptation of the artifact correction to the individual circumstances or particular features of the subject under examination can thereby be achieved and hence an improved artifact correction can be attained.

In an embodiment variant of the invention, which also corresponds to a main use of an embodiment of the present invention, the object element causing the image artifact is a metal element, in particular a metallic implant such as screws, bridges, dental implants, bone replacement, etc. According to this embodiment variant, the correction algorithm is a metal artifact correction algorithm, e.g. a known metal artifact correction algorithm as described in the introduction.

Embodiments of the invention are not limited to selecting metal artifact correction algorithms; correction of other image artifacts can be improved in a similar manner.

The artifact correction algorithm is designed to correct or to improve at least one image artifact; in particular, the artifact correction algorithm can be characterized in that it has a positive effect on the image quality by correcting more than just one image artifact. In particular, the artifact correction algorithm can be designed to correct one or more imaging errors, such as e.g. beam hardening, a partial volume effect or the like, which are specific to the underlying data acquisition technique, the medical imaging system and/or to the subject under examination, and thereby to produce an artifact correction.

With reference to embodiments of the present invention and without loss of generality, the subject under examination is assumed below to be a patient, normally a human patient. In principle, however, the patient may also be an animal. Thus the two terms "subject under examination" and "patient" are also used synonymously below. The subject under examination, however, may also be a plant or an inanimate object, e.g. an historic object or the like.

The region of interest corresponds to that (sub)region of the subject under examination that is imaged by the medical imaging system, in particular a specific region of the body, such as e.g. head, thorax, hip, lower leg, etc. In this case, image data relating only to this (sub)region is acquired. The region of interest may also cover the entire subject under examination or the entire patient, however. In this case, the medical imaging system acquires image data on the entire body of the subject under examination.

The medical imaging system is preferably a computed tomography system or a C-arm X-ray machine. Other embodiment variants of the medical imaging system, in particular from non-medical sectors, are likewise possible and are covered by embodiments of the present invention.

The acquired image data record can exist in the form of projection data, which can be converted into tomography images, i.e. image data in the image space, using reconstruction techniques known per se and thus not described in detail here, e.g. using the weighted filtered back projection (WFBP) technique. The image data record can thus also exist in the form of image data in the image space. Suitable operations such as e.g. forward projection can be used to derive projection data again from the image data. The projection data is thus equivalent to the image data.

In the method according to an embodiment of the invention, first one or more object elements that reduce the image quality and are the cause of the image artifact to be removed are identified in the image data record. At least one or more distinguishing characteristics of the at least one object element can be determined here. The characteristic is characterized in that it describes an object element in terms of its properties, in particular its physical properties, more closely, in detail and/or quantitatively. The at least one characteristic of the at least one object element is subsequently used to select an artifact correction algorithm that is especially well-suited to the particular object element. This algorithm is then applied to the image data record, resulting in image data in which the image artifact is reduced or eliminated.

In an embodiment variant of the invention, the object element causing an image artifact is identified in the projection space and/or in the image space. As mentioned in the introduction, the image data in the projection space and the image data in the image space are equivalent, and in particular can be converted into one another. Embodiments of the invention can therefore be applied particularly widely, because it makes it possible to select the most suitable procedure for the given situation.

In a preferred embodiment variant of the invention, however, the object element causing an image artifact is identified in the image space. In the image space, the image data typically exists in the form of image values per image element or per image point. In other words, in the two-dimensional case, each pixel is assigned one image value, and in the three-dimensional case, each voxel is assigned one image value. In computed tomography, the image values exist e.g. in the form of gray-level values. Identification can thereby be performed very easily and in particular automatically for each image point at a time and/or on the basis of a threshold. By this, image points having a high gray level lying above a particular threshold value, corresponding to a high signal attenuation (bright pixel/voxel), are accordingly assigned to the object element, and image points having a gray level lying below the threshold are not. This procedure can be used advantageously to dispense with manual determination of image points belonging to the object element. Established, known and in particular proprietary segmentation techniques that work as described can thereby be employed easily and in a cost-neutral manner in the context of embodiments of the invention.

If, as described above, the object element is identified from image data, then in an intermediate step, image data is created from uncorrected projection data or from projection data corrected in a conventional manner or at least initially in a known manner, which image data then forms the basis of the segmentation.

According to another embodiment variant, a threshold value can be defined on the basis of a user input for the purpose of identifying an object element. The method according to at least one embodiment of the invention can thereby be adapted easily to individual features particular to a subject under examination or to a particular form of the image data acquisition. In this case, the threshold value can be selected and/or adjusted by the user by entering a desired value or selecting a value from a predetermined list or even by sliding a bar within a particular, predetermined value range for the threshold value. The preset entries in the list can be based on characteristic gray levels for particular object elements, in particular metallic object elements. Other selection options are equally possible.

According to another embodiment variant of the invention, the at least one object element identified in this way is analyzed quantitatively. In this case, for the object element, at least one characteristic relating to the geometry, to the arrangement inside the region of interest and/or to the material properties of the object element causing the artifact is analyzed or determined. This step allows an artifact correction algorithm to be individually adapted or selected in the course of the method to suit the object element causing an image artifact, whereby image artifacts can be corrected particularly well.

According to a preferred embodiment variant, the at least one characteristic in this case comprises at least one of the following variables: number of object elements, mean size of object element, size of object element, material composition of object element, position of object element within the field of vision of the medical imaging system or with respect to other object elements. Thus at least one characteristic is used to define how many artifact-causing object elements there are inside the region of interest, how large (e.g. via the number of included image points) said object elements are individually or as an average, from what material(s) an object element is made (e.g. a metal alloy) and/or where or how an object element is arranged or oriented inside the region of interest or with respect to other object elements. All this information identifies the at least one object element in detail and beyond the type of the object element, e.g. metallic hip implant, allowing very precise adaptation or selection of an artifact correction algorithm on the basis of the at least one characteristic. In particular, the presence of further artifact-causing image elements and the specific position between these elements usually produce specific forms of artifacts, whether in terms of artifact intensity or artifact shape. These particular features can advantageously be taken into account according to the embodiments of the application and thereby eliminated more effectively.

According to another embodiment variant of the method according to the invention, the algorithm for correcting an image artifact for the region of interest of the subject under examination is determined multiple times, in particular slice by slice. In other words, it is possible to determine an artifact correction algorithm individually for each of a plurality of subregions of the region of interest. This determination is then based accordingly on at least one characteristic of the object element(s) causing the artifact and lying within the corresponding subregion or with respect thereto.

In particular, the subregions can be in the form of slices, in which case this embodiment variant addresses particularly the specific acquisition technology and acquisition geometry of a computed tomography system. In this case, the slices are preferably oriented according to the acquisition protocol perpendicular to the feed direction of the subject under examination during the image data acquisition or tilted about the horizontal and across the feed direction. The slice thickness can here be set for the particular situation and can equal e.g. at least the distance along the feed direction of the patient that the imaging system travels for a half-orbit of the patient. Other desired thicknesses resulting from the particular acquisition technology are equally possible. The slice-by-slice determination of the artifact correction algorithm allows particularly precise adaptation of a correction rule to the local circumstances of the subject under examination. The subregions can take any shape in addition to the described slice form, with other shapes for the subregions, for instance spherical, prismatic or cuboid zones, being equally possible.

According to another embodiment of the present invention, determining the algorithm for correcting an image artifact for the region of interest of the subject under examination comprises defining a parameter set for an algorithm on the basis of the at least one characteristic, and applying the artifact correction algorithm to the image data record comprises applying the artifact correction algorithm using the defined parameter set. While one of at least two different, or different types of, artifact correction algorithms can be selected on the basis of the determined characteristics, this embodiment variant of the invention alternatively or additionally comprises adapting parameters in order to adjust an already selected or specified artifact correction algorithm. The correction algorithm is then applied in accordance with the defined parameter set. A parameter set comprises at least one parameter, although normally a plurality of parameters. The number and nature of the parameters is obtained in particular from the type of the correction algorithm. A parameter set defines how an artifact correction is applied to image data.

According to another embodiment variant, defining a parameter set comprises comparing the at least one characteristic with at least one reference quantity. According to this embodiment, at least one parameter in the parameter set is assigned on the basis of a comparison of a characteristic with a value of a reference quantity. Said reference quantity is based e.g. on a mean value or a value range for the characteristic under consideration, which can be obtained from a multiplicity of previous image data acquisitions, image artifact correction processes or other empirical values stored in the system. For each reference value is stored at least one parameter for a particular artifact correction, which parameter is then used if, when selecting said particular artifact correction algorithm, the characteristic is associated with the reference quantity. In particular, the comparison can be performed automatically. It can also be provided, however, that a user makes inputs relating to confirming the automatic comparison.

According to a preferred embodiment variant of the invention, when a plurality of characteristics are compared with a plurality of reference quantities, the characteristics are weighted. A weight is accordingly stored for each characteristic or each reference quantity relevant to specifying a parameter of a parameter set, which weight is also compared in the event that a plurality of characteristics are under consideration. The characteristic having the greatest weight decides the parameter that is selected. This procedure ensures that the method according to at least one embodiment of the invention works safely and reliably for the situation in which comparing different characteristics would result in different parameter values.

At least one embodiment of the invention also relates to a data processing facility for selecting an algorithm for correcting an image artifact in an image data record that is acquired by a medical imaging system and represents at least one region of interest of a subject under examination. This data processing facility is designed:
  to identify from the image data record at least one object element that is causing an image artifact and lies inside the region of interest of the subject under examination;
  to determine from the image data record at least one characteristic describing the object element;
  to determine a suitable artifact correction algorithm on the basis of the at least one characteristic; and
  to apply the artifact correction algorithm to the image data record.

The term "data processing facility" shall be understood to mean generally a computer or a plurality of computers in data communication with one another, each comprising at least one processor. The data processing facility can be e.g. embodied and integrated as software or as a software module, for example, in a control unit, image editing unit or image processing unit or in a reconstruction unit of a medical imaging system, as is described in greater detail later. The data processing facility can be in the form of individual units, with each unit being designed to perform at least one processing step of the method according to embodiments of the invention. Alternatively, all the processing steps can also be performed by one unit. The data processing facility can be embodied physically as a unit or module or as a combination of individual separate submodules, in particular also in a distributed manner. In whatever embodiment, they have a (wireless or wired) data connection to one another in order to be able to exchange the data needed for the various process steps.

With regard to a detailed description and/or advantages of individual aspects of the data processing facility according to embodiments of the invention, reference is made to the embodiments of the method according to embodiments of the invention, which can be applied correspondingly to the device.

In addition, at least one embodiment of the invention relates to a medical imaging system for selecting an algorithm for correcting an image artifact in an image data record that is acquired by the imaging system and represents at least one region of interest of a subject under examination. This medical imaging system comprises a data processing facility which is designed:
  to identify from the image data record at least one object element that is causing an image artifact and lies inside the region of interest of the subject under examination;
  to determine from the image data record at least one characteristic describing the object element;
  to determine a suitable artifact correction algorithm on the basis of the at least one characteristic; and
  to apply the artifact correction algorithm to the image data record.

In a particularly preferred embodiment variant, the medical imaging system is in the form of an X-ray computed tomography machine or a C-arm X-ray machine.

FIG. 1 shows a medical imaging system in the form of a computed tomography apparatus. The computed tomography machine shown here has an acquisition unit 17 comprising an X-ray source 8 and an X-ray detector 9. The acquisition unit 17 rotates about a system axis 5 during the acquisition of X-ray projections, and the X-ray source 8 emits X-rays 2 during the acquisition.

A patient 3 lies on a patient couch 6 during the acquisition of X-ray projections. The patient couch 6 is connected to a couch base 4 such that the base supports the patient couch 6 bearing the patient 3. The patient couch 6 is designed to move the patient 3 along an acquisition direction through the aperture 10 of the acquisition unit 17. The acquisition direction is usually defined by the system axis 5 about which the acquisition unit 17 rotates during the acquisition of X-ray projections. In this example, the body axis of the patient 3 is the same as the system axis 5. For a spiral acquisition, the patient couch 6 is moved continuously through the aperture 10 while the acquisition unit 17 rotates about the patient 3 and acquires X-ray projections. The X-rays 2 thus describe a spiral on the surface of the patient 3.

The computed tomography machine has a data processing facility 12 in the form of a computer, which is connected to a display unit 11, for instance for the graphical display of X-ray image acquisitions, and to an input unit 7. The display unit 11 may be an LCD, plasma or OLED screen, for instance. It may also be a touchscreen, which is also embodied as the input unit 7. Such a touchscreen may be integrated in the imaging machine or be designed as part of a portable device. The input unit 7 is, for example, a keyboard, a mouse, a touchscreen or even a microphone for voice input. The input unit 7 can also be designed to detect and convert into suitable commands, movements of a user. A user can use the input unit 7, for instance, to confirm a segmentation of an object element causing an image artifact, which segmentation is performed automatically by the computer 12, or to confirm values or a value for one or more reference quantities.

The computer 12 is connected to the rotatable acquisition unit 17 for the purpose of data transfer. Via the connection 14, control signals for the X-ray image acquisition are transmitted from the computer 12 to the acquisition unit 17, and also projection data acquired for the patient 3 can be transmitted to the computer 12 for an image reconstruction. The connection 14 is implemented in wired or wireless form in a known manner.

According to this example embodiment, the data processing facility 12 in the form of the computer comprises a locally arranged processing unit 16. The processing unit 16 is embodied as an image processing unit or an image-data processing unit. It is designed in particular to perform all the processing steps relating to the method according to at least one embodiment of the invention on an image data record acquired by the acquisition unit 17. The, or any, image data record can also be provided to the processing unit 16 by another medical imaging system, however, and need not have been captured at a time immediately before further processing of the image data record by the processing unit 16. For instance, the image data record can be supplied to the processing unit 16 via a portable machine-readable data storage medium known per se, via a hospital information system or radiology information system (HIS or RIS) or via the Internet in a manner known per se. The processing unit 16 comprises an identification unit 21 for identifying from the image data record at least one object element that is causing an image artifact and lies inside a region of interest, and a determination unit 22, which determines at least one characteristic that describes the identified object element, and determines a best-possible artifact correction algorithm on the basis of the at least one characteristic. In addition, the processing unit 16 also comprises an image reconstruction unit 23, which applies the selected artifact correction algorithm to the image data record to generate result images which are corrected of the image artifact. For this purpose, the image reconstruction unit 23 is designed to perform on the image data record back-projection and forward-projection steps known per se for the particular reconstruction technique and according to the form of the previous method steps. For the purpose of determining a suitable artifact correction algorithm, the determination unit 22 can compare at least one value for a characteristic with a reference quantity, or compare a plurality of characteristics with corresponding reference quantities. These reference values can be stored locally or remotely in a memory (not shown), with which the determination unit 22 is in data communication.

The processing unit 16 can interact with a machine-readable data storage medium 13, in particular in order to perform a method according to at least one embodiment of the invention via a computer program containing program code. In addition, the computer program can be stored in retrievable form on the machine-readable storage medium. The machine-readable storage medium can be in particular a CD, DVD, Blu-Ray disc, a memory stick or a hard disk. The processing unit 16, and thus also its sub-components, can be in the form of hardware or software. For example, the processing unit 16 is embodied as an FPGA (Field Programmable Gate Array) or comprises an arithmetic logic unit. Each or all of the sub-components can alternatively also be arranged remotely, e.g. individual processing steps of the method can be performed in a central processing center of a medical service facility, e.g. a hospital, or in the cloud. In particular in this case, data protection and patient protection must be taken into account in the data transfer.

In the embodiment shown here, at least one computer program is stored in a memory of the data processing facility 12, which computer program performs all the method steps of the method according to at least one embodiment of the invention when the computer program is executed on the computer 12. The computer program for performing the method steps of the method according to at least one embodiment of the invention comprises program code. In addition, the computer program can be in the form of an executable file and/or can be stored in another processing system other than the computer 12. For example, the X-ray imaging apparatus can be designed such that the computer 12 downloads the computer program for performing the method according to at least one embodiment of the invention to its internal main memory via an intranet or via the Internet.

Figure 2:
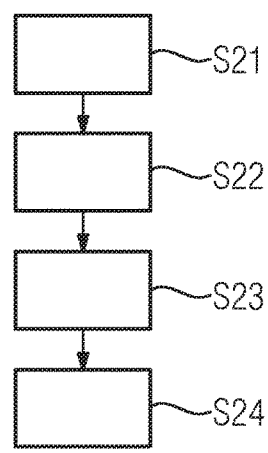
FIG. 2 is a flow diagram of the method according to an example embodiment of the application.
Figure 3A:
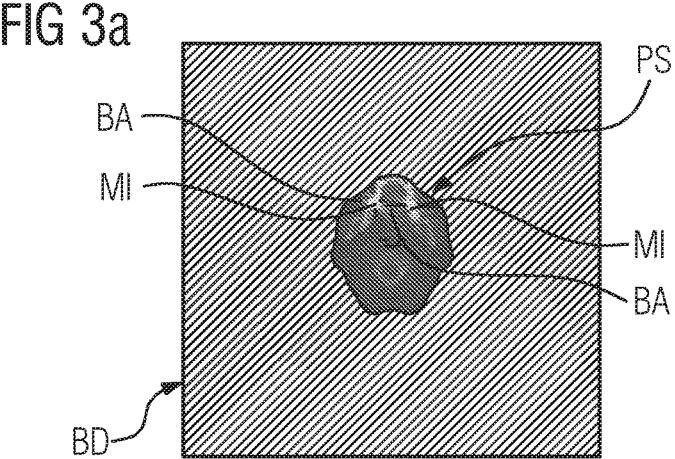
FIGS. 3a-3d show an example embodiment of the method according to the application with reference to an artifact-impaired image data record (FIG. 3a), the artifact-causing object elements segmented in the data record (FIG. 3b), and characteristics diagrams for determining a suitable artifact correction algorithm (FIG. 3c, 3d).

FIG. 2 explains an example embodiment of the method according to the invention. In a first step S21, at least one object element causing an image artifact is identified. Metallic object elements in the form of implants are considered in particular here as such object elements. For the identification, recourse is made to an image data record BD in the form of an initially reconstructed computed tomography acquisition, i.e. in this case a computed tomography acquisition reconstructed without metal correction. As illustrated in FIG. 3a, the computed tomography acquisition shows by way of example a cross-sectional view of a patient skull PS. The image comprises artifact-causing object elements MI in the form of implants made of metal in the jaw of the patient 3, which are identified by especially bright gray levels in the associated image elements. In addition, the image data record BD shown in FIG. 3a also comprises the image artifacts BA typical of metallic structures in the form of streaks radiating from the implants MI. These severely impair the image quality of the image data record BD, in particular immediately adjacent to the metallic elements MI.

Figure 3B:
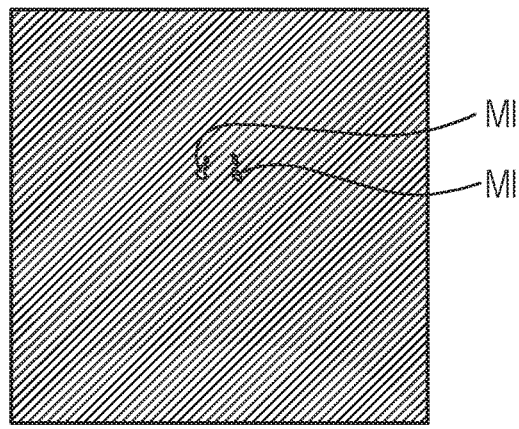

In order to identify the metallic object elements MI, a threshold-level technique is applied to all the image elements in this case. In other words, in step S21, the gray level of each image element of the image data record BD is compared with a threshold value. If the gray level of the image element lies above the threshold, the image element is assigned to the object element MI; if the gray level lies below the threshold, the image element does not belong to the metallic object element MI. The segmentation is performed here using a threshold in the form of a Hounsfield unit (HU) value of 2000. This threshold value can be fixed or can be adjusted subsequently manually by a user by system input, e.g. to suit the region of interest or the specific acquisition protocol that was used in acquiring the image data record BD. In particular, after segmentation using an initial threshold value, the threshold value can be adjusted once or more than once so that the segmentation of the metal into the initially reconstructed image data record BD is the best possible match to a realistic representation of the metal implant MI. The identification step S21 produces an (exact) representation of the at least one metallic object element or implant MI, as shown in FIG. 3b. All the image elements that were assigned to the metal implant MI are shown as white image elements in FIG. 3b. At least one characteristic KG of the metal implant MI can be derived below from this segmentation or assignment. This is performed in step S22. In this step S22, the segmented image data record BD is examined with regard to the size and the density of the identified metal implants MI. For instance, the number of image elements forming a contiguous region containing gray levels above the threshold value represents the size of a metal implant MI, and the mean gray level of these image elements represents the density of the corresponding metal implant MI. In other words, the present example embodiment takes into account the characteristics KG of size (KG2) and density (KG1) of a metal implant MI. As already explained in detail in the introduction, it is of course also possible to determine other characteristics KG, in particular just one characteristic or more than two characteristics KG, and to take same into account in selecting the artifact correction algorithm.

Figure 3C:
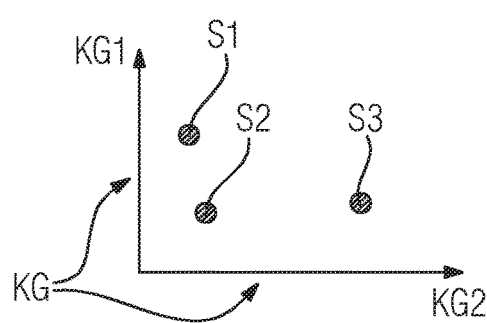

The characteristics KG considered here of size (KG2) and density (KG1) are now used in step S23 for selecting a suitable artifact correction algorithm. The values determined for the size and the density of the metal implant MI can now be plotted, for example, in a characteristics diagram as shown in FIG. 3c, in which the first characteristic KG1 is plotted here by way of example as the ordinate, and the second characteristic KG2 as the abscissa. Dental implants typically yield small sizes but have a high density because of the material used for these implants, with the result that generally, but not exclusively, they are located close to, or inside, the centroid zone S1. On the other hand, if e.g. hip implants are considered, then these are usually made of less dense material but are far larger for this purpose. In the diagram, these lie usually around or inside the centroid zone S2. Again, however, this is not true in every case, and suitable selection of a correction algorithm requires individual verification. In contrast, spinal implants are often small in size with a density comparable to hip implants, with the result that such implants typically lie around or in the centroid zone S3.

Figure 3D:
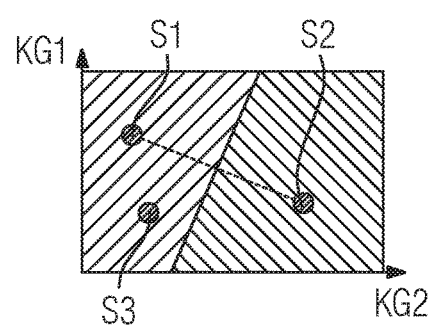

Based on the relationship between first and second characteristics KG1, KG2, the characteristics diagram can be divided into regions having preferred correction algorithm classes, as shown in FIG. 3d for example. According to this division, weak correction algorithms (WCA) in particular are normally suitable for dental and spinal implants, and strong correction algorithms (SCA) for hip implants. The method according to at least one embodiment of the invention, however, verifies or improves this empirical assignment of the correction algorithm by now determining the appropriate algorithm not just on the basis of the type of the implant but by finding the distance of the position of the characteristics pair KG1, KG2 from the centroid zones S1, S2, S3. According to at least one embodiment of the invention, the algorithm is used for which the distance to its centroid is shortest. Thus according to at least one embodiment of the invention, e.g. a weak correction algorithm may even be determined for a hip implant as a result of the determined characteristics KG1, KG2.

If more than two characteristics at once are taken into account in establishing a suitable algorithm, a principal component analysis known per se can be applied in order to determine the best-suited correction algorithm. As an alternative to the described procedure, if a plurality of characteristics KG are taken into account, each of said characteristics are weighted, with the characteristic KG that has the greatest weight deciding which correction algorithm is used. In a further method step S24, the selected correction algorithm is applied to the image data record BD in order to correct in the best possible manner the existent image errors BA, resulting in corrected and hence realistic tomographic images of the region of interest of the patient 3.

The method according to an embodiment of the invention can be performed at various times during an examination of a patient 3. The described procedure allows a metal artifact correction, which is adapted e.g. to suit an existent implant, to be determined automatically as early as after a topographic acquisition, because even at this point in time it is possible to acquire and analyze characteristics KG such as size, position, density, arrangement inside the region of interest and/or with respect to other object elements, in particular other object elements causing artifacts. This correction selection is then used to correct all the slices in the region of interest. On the other hand, the method according to at least one embodiment of the invention can be performed repeatedly, preferably even multiple times during an image data acquisition, in particular slice by slice. An optimized selection of the correction parameters of the correction algorithm can thereby be made for each slice, which achieves particularly well-corrected image data, because the characteristics can be re-determined and taken into account for each individual slice.

Thus account is taken not just of the type of a specific metal implant MI, but it is possible to take detailed account of the exact, local spatial embodiment of the metal implant, its density and its local arrangement and position inside the region of interest.

The same obviously applies also to other non-metallic artifact-causing image elements, to which at least one embodiment of the invention can be applied correspondingly.

Advantages of the embodiments include and are discussed again below:

At least one embodiment of the present invention uses characteristics to take into account various features of an artifact-causing object element beyond the type of this artifact-causing object element, for instance features such as the size, the position, the material properties such as density, etc. These characteristics are ideal for selecting an artifact correction algorithm that is optimally adapted to the artifact-causing object element. In particular, the parameter settings of a correction algorithm depend more on the size and density of the object element causing the artifact than on the type of the element (e.g. hip implant). The characteristics are determined by an automatic or at least semi-automatic analysis of the acquired image data record in the image space or projection space. The slice-by-slice implementation of the present method allows a particularly exact selection of a correction algorithm adapted to the local characteristics of an artifact-causing object element. This can rule out mistakes in manual operation and selection of a correction algorithm, e.g. by inexperienced assistant medical technicians.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for selecting an algorithm for correcting at least one image artifact in an image data record that is acquired by a medical imaging system and represents at least one region of interest of a subject under examination, the method comprising:
    identifying, from the image data record, at least one object element causing the at least one image artifact and lying inside the at least one region of interest of the subject under examination;
    determining, from the image data record, a plurality of characteristics describing the identified at least one object element;
    determining an artifact correction algorithm based on a relationship amongst the determined plurality of characteristics; and
    applying the determined artifact correction algorithm to the image data record.

2. The method of claim 1, wherein the at least one object element causing the image artifact includes a metal element, and wherein the artifact correction algorithm includes a metal artifact correction algorithm.

3. The method of claim 2, wherein the metal element includes a metallic implant.

4. The method of claim 2, wherein the identifying the at least one object element causing the at least one image artifact includes identifying the at least one object element in at least one of projection space or an image space.

5. The method of claim 4, wherein the identifying at least one object element causing the at least one image artifact includes identifying the at least one object element at least one of
    in an image space for each image point at a time, or
    based on a threshold.

6. The method of claim 5, wherein a user input defines a threshold value of the threshold.

7. The method of claim 2, wherein the determining an artifact correction algorithm based on a relationship amongst the plurality of determined characteristics includes determining the artifact correction algorithm multiple times.

8. The method of claim 2, wherein the determining an artifact correction algorithm based on a relationship amongst the plurality of characteristics includes
    defining a parameter set for the artifact correction algorithm based on the plurality of characteristics, and
    wherein the applying the determined artifact correction algorithm to the image data record includes,
    applying the determined artifact correction algorithm using the defined parameter set.

9. The method of claim 8, wherein the defining a parameter set includes comparing at least one of the plurality of characteristics with at least one reference quantity.

10. The method of claim 9, wherein the at least one reference quantity includes a plurality of reference quantities, and
    wherein the comparing the at least one of the plurality of characteristics with the at least one reference quantity includes comparing the plurality of characteristics with the plurality of reference Quantity by weighting the plurality of characteristics.

11. The method of claim 1, wherein the identifying the at least one object element causing the at least one image artifact includes identifying the at least one object element in at least one of projection space or an image space.

12. The method of claim 11, wherein the identifying the at least one object element causing the at least one image artifact includes identifying the at least one object element at least one of,
    in the image space for each image point at a time, or
    based on a threshold.

13. The method of claim 12, wherein a user input defines a threshold value of the threshold.

14. The method of claim 1, wherein at least one of the plurality of characteristics includes a characteristic relating to,
    a geometry of the at least one object element,
    an arrangement of the at least one object element inside the at least one region of interest,
    material properties of the at least one object element, or
    a sub-combination thereof, or
    a combination thereof.

15. The method of claim 1, wherein the at least one of the plurality of characteristics comprises,
    a number of the at least one object element,
    a size of the at least one object element,
    a mean size of the at least one object element,
    a material composition of the at least one object element,
    position of the at least one object element within the field of vision of the medical imaging system,
    a position of the at least one object element with respect to other object elements, or
    a sub-combination thereof, or
    a combination thereof.

16. The method of claim 1, wherein the determining an artifact correction algorithm based on a relationship amongst the plurality of characteristics includes,
    determining the artifact correction algorithm a plurality of times.

17. The method of claim 16, wherein the determining an artifact correction algorithm based on a relationship amongst the plurality of determined characteristics includes determining the artifact correction algorithm multiple times, slice by slice.

18. The method of claim 1, wherein the determining an artifact correction algorithm based on a relationship amongst the plurality of characteristics includes,
    defining a parameter set for the artifact correction algorithm based on the plurality of characteristics, and
    wherein the applying the determined artifact correction algorithm to the image data record includes,
    applying the determined artifact correction algorithm using the defined parameter set.

19. The method of claim 18, wherein the defining a parameter set for an algorithm includes comparing at least one of the plurality of characteristics with at least one reference quantity.

20. The method of claim 19,
    wherein the at least one reference quantity includes a plurality of reference quantities, and
    wherein the comparing the at least one of the plurality of characteristics with the at least one reference quantity includes comparing the plurality of characteristics with the plurality of reference quantities by weighting the plurality of characteristics.

21. The method of claim 1, wherein the determining an artifact correction algorithm based on a relationship amongst the determined plurality of characteristics includes, determining the artifact correction algorithm based on a relationship amongst a first of the plurality of characteristics and a second of the plurality of characteristics, the first of the plurality of characteristics being different from the second of the plurality of characteristics.

22. A data processing facility for selecting an algorithm for correcting an image artifact in an image data record acquired by a medical imaging system and representing at least one region of interest of a subject under examination, the data processing facility including one or more processors configured to execute computer-readable instructions such that the one or more processors are configured to:

identify, from the image data record, at least one object element causing an image artifact and lying inside the at least one region of interest of the subject under examination;

determine, from the image data record, a plurality of characteristics describing the identified at least one object element;

determine an artifact correction algorithm based on a relationship amongst the determined plurality of characteristics; and apply the determined artifact correction algorithm to the image data record.

23. A medical imaging system for selecting an algorithm for correcting an image artifact in an image data record acquired by the imaging system and representing at least one region of interest of a subject under examination, the medical imaging system including a data processing facility, the data processing facility including one or more processors configured to execute computer-readable instructions such that the one or more processors are configured to:

identify, from the image data record, at least one object element causing an image artifact and lying inside the at least one region of interest of the subject under examination;

determine, from the image data record, a plurality of characteristics describing the identified at least one object element;

determine an artifact correction algorithm based on a relationship amongst the determined plurality of characteristics; and apply the determined artifact correction algorithm to the image data record.

24. The medical imaging system of claim 23, wherein the medical imaging system includes at least one of an X-ray computed tomography machine or a C-arm X-ray machine.

* * * * *